United States Patent [19]

Spears et al.

[11] Patent Number: 5,666,156
[45] Date of Patent: Sep. 9, 1997

[54] SYSTEM AND METHOD TO IMPROVE THE QUALITY OF REPRODUCED IMAGES ON A FILM TO VIDEO TRANSFER DEVICE

[76] Inventors: Steven Spears, P.O. Box 579, San Dimas, Calif. 91773; David Walker, 731 Puma Canyon La., Glendora, Calif. 91740

[21] Appl. No.: 418,371

[22] Filed: Apr. 7, 1995

[51] Int. Cl.⁶ .................. H04N 3/38; H04N 5/253; H04N 9/11
[52] U.S. Cl. .................. 348/103; 348/241; 348/106; 386/5; 386/110
[58] Field of Search .................. 348/443, 106, 348/97, 103, 241; 358/335, 313; 386/5, 110; H04N 3/38, 5/253, 9/11

[56] References Cited

U.S. PATENT DOCUMENTS

| | | | |
|---|---|---|---|
| 3,886,589 | 5/1975 | Nasu | 358/313 |
| 4,133,009 | 1/1979 | Kittler | 358/313 |
| 4,298,896 | 11/1981 | Heitmann | 358/313 |
| 4,823,204 | 4/1989 | Holland | 348/97 |
| 5,159,437 | 10/1992 | Lee | 348/443 |
| 5,179,314 | 1/1993 | Walker | 348/106 |

*Primary Examiner*—Howard W. Britton
*Attorney, Agent, or Firm*—Blakely Sokoloff Taylor & Zafman

[57] ABSTRACT

A system and method to improve the quality of reproduced images on a film to video transfer device by scanning extra lines to reduce vertical aliasing and performing vertical sample rate reduction to produce the correct number of video output lines High frequency noise is reduced as a result of the vertical sample rate reduction which produces a line filtering. More lines are scanned than normal and the distance between lines is reduced so that the larger number of lines covers the original film image area. This has the effect of increasing the sampling frequency in the vertical direction and therefore reducing aliasing. To provide the correct number of lines in the output of the film to video sample, rate reduction is performed. Sample rate reduction is performed by filtering multiple adjacent lines to remove any high frequency content that would be aliased at the lower rate. Lines are discarded in a predefined sequence that is a function of the fractional reduction rate.

12 Claims, 2 Drawing Sheets

SYSTEM AND METHOD TO IMPROVE THE QUALITY OF REPRODUCED IMAGES ON A FILM TO VIDEO TRANSFER DEVICE

BACKGROUND OF THE INVENTION

1. Field of the Invention

The invention is for use in conjunction with film to video transfer machines, with its particular application utilizing signal processing techniques to produce a video image from the film of higher quality than would be the case without use of the invention.

2. Brief Description of the Prior Art

In film to video transfer machines such as the telecine machines sold by Rank Cintel, film containing a moving video image is run through a light/lens/scanner system and each film frame is sampled and video signals are generated suitable for recording on a video tape. In sampling systems of this type, it is well-known that aliasing will occur if the signal being sampled has energy above a frequency which is one half the sampling frequency. A frequency one half the sampling frequency is known as the Nyquist frequency. In film to video transfer machines, it is common practice to use a non-interlaced raster scanned CRT to convert the photographic film images to video signals. The light from the CRT is focused on the film and photo detectors on the other side of the film produce electrical signals representing the color and intensity of the film images as they pass by the photo detectors.

In film to video transfer machines, it is also standard practice to convert the video signals recovered from the film to digital signals. The digitized image is then stored in a memory device to provide for sequential to interlace conversion. The memory device is called a frame store and it also does the translation from the film frame rate to the video output rate. For example, the film rate could be 23.98 frames per second and the output video standard rate could be 29.97 frames per second.

The video signals are passed through anti-aliasing low pass filters before being converted to digital signals. There is normally no filtering vertically. Vertical filtering is difficult to perform optically because the distance between scan lines changes depending on zoom amount and film velocity. It is also not desirable reduce the horizontal resolution. The scanning spot could be expanded vertically, but this will result in less resolution and may be difficult to perform when electronic rotate is used. Images that have high frequency components will cause vertical aliasing.

Another effect that is objectionable is interlace flicker. This occurs when adjacent line are significantly different. Every other line comes from a different field at half the frame rate. This effect can be noticed for example when the image contains horizontal lines such as a car grill or horizontal window blinds. Another noticeable effect is that diagonal lines tend to be jagged.

SUMMARY OF THE INVENTION

The invention is a system and method to improve the quality of reproduced images on a film to video transfer device by scanning extra lines to reduce vertical aliasing and performing vertical sample rate reduction to produce the correct number of video output lines. This invention also has the effect of reducing high frequency noise as a result of the vertical sample rate reduction which produces line filtering.

To reduce vertical aliasing and interlace flicker which occur in prior art systems, in accordance with the present invention, more lines are scanned than normal and the distance between lines is reduced so that the larger number of lines covers the original film image area. This has the effect of increasing the sampling frequency in the vertical direction and therefore reducing aliasing. To provide the correct number of lines in the output of the film to video sample, rate reduction is performed. Sample rate reduction is performed by filtering multiple adjacent lines to remove any high frequency content that would be aliased at the lower rate. Lines are discarded in a predefined sequence that is a function of the fractional reduction rate.

It should be noted that there is a problem associated with scanning more lines. Depending on the amount of zoom, film speed, and other scan effects, the distance between consecutive lines scanned on a CRT can become very small. This can result is a degradation of the image and shorten CRT life. See U.S. Pat. No. 5,179,314 of Jan. 12, 1993. However, if the techniques of the invention described herein are used, these problems are greatly reduced.

DETAILED DESCRIPTION OF THE INVENTION

Figure 1:
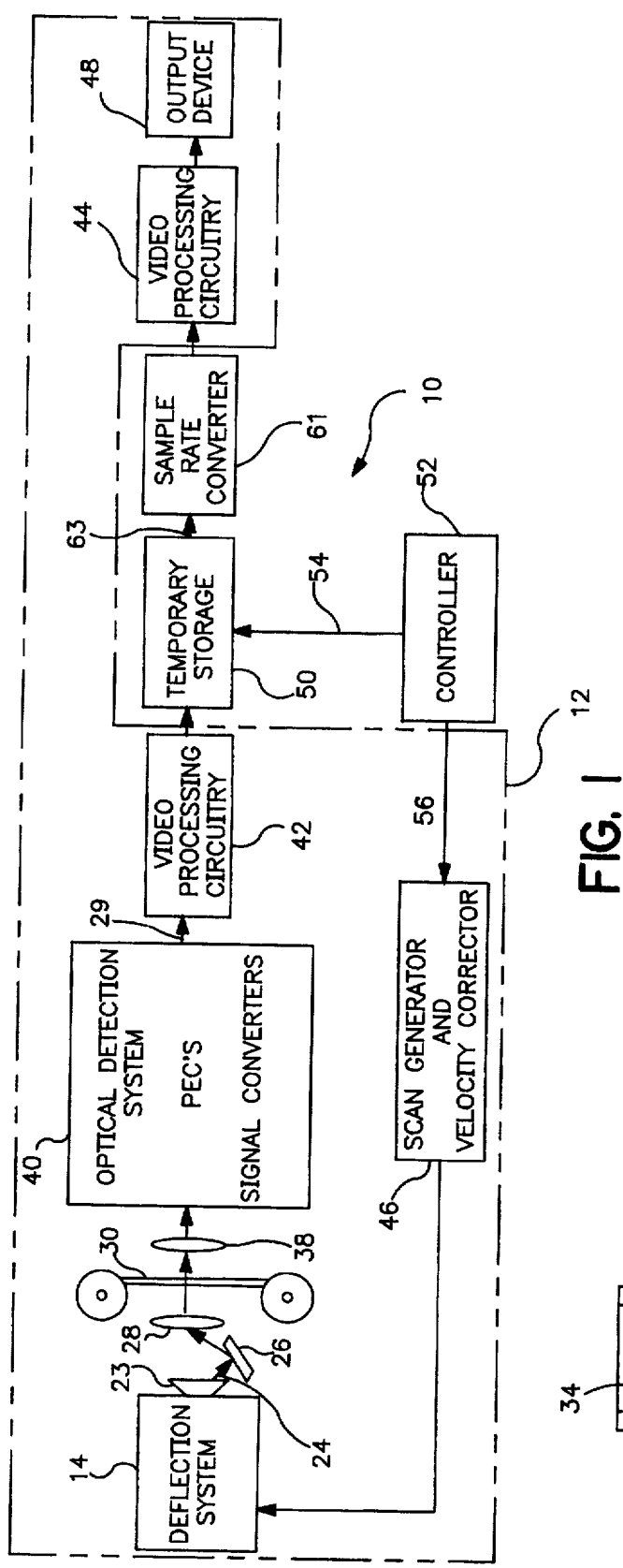
FIG. 1 is a block diagram of a film-to-video transfer system such as a telecine including CRT non-sequential raster scanning and a sample rate converter according to the present invention.

FIG. 1 is a schematic representation of a CRT raster scanning incorporated into a film-to-video transfer system such as a telecine, including the improvements provided by the present invention. One example of a telecine is the telecine described in the patent to David E Holland, U.S. Pat. No. 4,823,204 issued Apr. 18, 1989, entitled "Method and Apparatus for Film Weave Correction." A typical prior art film-to-video transfer system 10 incorporates telecine 12, temporary storage apparatus 50 and controller 52. The present invention also includes sample rate converter 61 and particular settings of scan generator and velocity corrector 46 as explained in detail below.

In a standard telecine 12 as shown in FIG. 1, a high-powered deflection system 14 deflects an electron beam generated by an electron gun in cathode ray tube 23. The electron beam is deflected across the interior surface of the screen of the cathode ray tube 23 by deflection system 14 exciting phosphorous on the interior surface of the screen producing emitted light beam 24. The light beam 24 emitted from the CRT 23, strikes mirror 26 and is focused through first lens 28.

Figure 2:
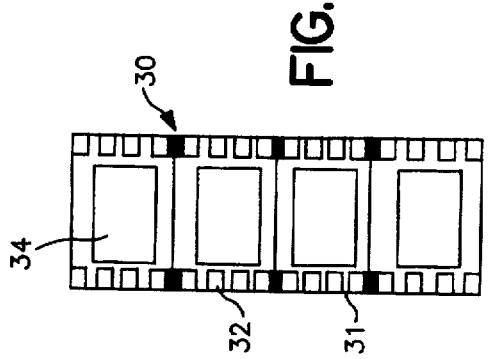
FIG. 2 is a schematic representation of a piece of film.

The sequential deflection of the electron beam 24 across the CRT screen produces over time a raster scan on the screen. Light beam 24 emitted from the CRT 23 consequently scans across a strip of moving film 30. The moving film strip 30 includes individual film frames 34 and sprockets 32 and edge 31 as best seen in FIG. 2. The sequentially deflected light beam 24 scanning individual film frames 34 passes through the back side of the film strip 30 through second lens 38. Light beam 24 passing through second lens 38 is detected by optical detection system 40.

Optical detection system 40 incorporates photoelectric cells which generate electrical signals 29 in response to the detected light beam 24. These electrical signals 29 are amplified by amplifiers located within optical detection system 40 and analog to digital converters, convert the amplified analog to digital electrical signals 29.

The digital electrical signal 29 processed through existing telecine video circuitry 42, enters a temporary storage apparatus 50 which in a digital film-to-video transfer system consists of random access memory (RAM) chip(s).

Electrical signals 29, stored in temporary storage apparatus 50 are manipulated by controller 52. Addresses describing the location of the light beam 24 detected by photo-detectors in the optical detection system 40 are assigned to electrical signals 29 stored in temporary storage apparatus 50. These signals 29 are stored in a non-sequential order. Controller 52 reorders the non-sequentially scanned stored signals 29 into a predetermined sequential order using established programs. The controller 52, is further programmed to deflect the electron beam 24 using a deflection signal on bus 56 to the deflection system 14. Scan generator and velocity corrector 46 determines what area of the CRT screen is scanned while controller 52 determines the scanning sequence. Scan generator and velocity corrector 46 also provide velocity correction of the deflected electron beam 24 to correct for film movement.

Sample rate converter 61 receives digitized video signal 63 from temporary storage 50 and processes the signal as described below with reference to FIG. 3. The video signal produced by sample rate converter 61 are then input to video processing circuitry 44, which is also part of telecine 12 for use by output device 48, shown as part of the telecine 12. Video processing circuitry 44 is called a frame store and it performs sequential to interlace conversion and the translation from the film frame rate to the video output rate. Output device 48 could be, for example, signals to be fed to a color monitor or an electrical signal used to produce a video tape.

FIG. 1, excepting for sample rate converter 61, is substantially identical to FIG. 1 of U.S. Pat. No. 5,179,314, and further details concerning telecine 12 and its components may be found in this patent.

Figure 3:
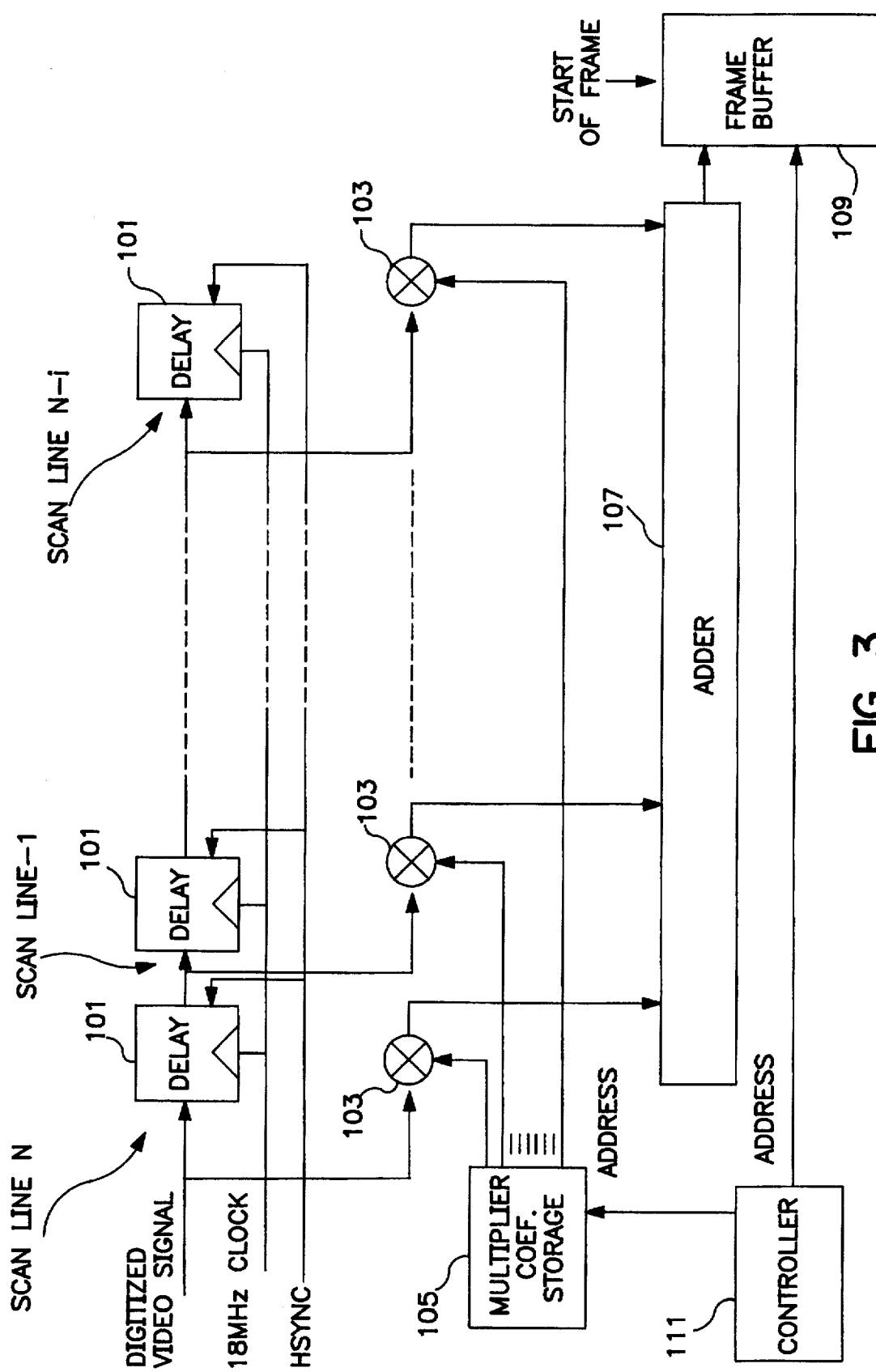
FIG. 3 is a detailed block diagram of a sample rate converter of the type that may be utilized in the present invention.

Referring now to FIG. 3, a sample rate converter of the type that may be utilized in the present invention will now be described.

FIG. 3 shows a portion of a sample rate converter of the type known in the art to be used in a standards converter, i.e., a converter used to convert video signals from one video standard such as PAL to another video standard such as NTSC. Although such devices are well known in the art, the present invention utilizes sample rate conversion in a different way for a different purpose, i.e., to perform vertical sample rate reduction while providing an output image having a number of scan lines equal to the resolution of the output device. In the prior art, it is known that increasing the number of scan lines may be obtained by increasing the scanning frequency. This normally results in a larger scanning area (or patch size) when the film 30 being scanned is moving past the scanner lenses 28 and 38. Since the velocity correction may adversely affect run patch size, it may be beneficial to utilize the techinques described in U.S. Pat. No. 5,179,314 to increase the run patch size, if necessary.

The present invention requires that scan generator and velocity corrector 46 be programmed to provide a source image with substantially more scan lines than needed by the output device so that the vertical sample rate reduction performed by block 61 (the circuit of FIG. 3) produces an image with the correct number of scan lines.

A telecine with a scan generator and velocity corrector which may be programmed to produce an image with the correct number of scan lines is the Rank Cintel Turbo II with a digital deflection system manufactured by Digital Audio & Video. The scan generator in this system can be modified using software or hardware to scan the extra lines required as follows.

Describing first software modifications needed to scan the extra lines, it should be noted that the scan generator board part number 0000-1752 rev 1 uses dual port RAMs addressed by a 12 bit counter that is incremented at the end of each line and reset at the beginning of the frame. The other port of the RAM is connected to a microprocessor which is part of the scan generator. This microprocessor fills the RAM based on tables stored in an EPROM used by the microprocessor. There are 3 dual port RAMs on the scan generator board. Two of the RAMs generate a 16 bit vertical scan address. The CRT addressing has a two's complement bipolar addressing format. The center of the CRT is zero. The top of the CRT is represented by negative addresses. The normal 4:3 aspect, 525 line mode has a line to line increment value of 62.8067 and 487 active lines. The scan addresses can be generating by making a counter start at −64 times half the number of lines and incrementing by 64 each line and using this count gain value multiplied by a constant fraction for each line address. The scan generator uses a YAGAIN constant of 32156/32767 to make the normal line address increment value of 62.8067. To generate the proper scan addresses for this invention, the number of lines is increased and the YAGAIN constant is reduced. For example, if 3/2 times as many lines are required, the active lines would be 487 times 3/2 which is 731. The YAGAIN of 32156 would be scaled down by 2/3 which is 21437. This results is a line to line increment value of 41.8711.

The other RAM generates various timing signals including the CRT blanking signal. The blanking signal needs to be narrowed to accommodate the extra lines. The specifics of the programming needed to accomplish this task would be readily apparent to a person skilled in the art given the description provided herein.

Instead of modifying the software to scan the extra lines, the changes can be made to the hardware. The dual port RAMs can be replaced with EPROMs. For example a 27C512 64 k×8 EPROM could be used. The upper four address lines can be used to select different scanning modes. The different nonsequential addressing modes can be done by reordering the data in the EPROMs. The velocity compensation counters should be present with minus half the number of lines scanned. If this is not done the picture would be shifted vertically when played back. The could be adjusted by the telecine framing control, but it is preferable to adjust the velocity counters so that they reach zero at the vertical midpoint of the scanning process.

The circuit of FIG. 3 receives a single video signal component, i.e. a red, blue or green which is input to line delay 101 and multiplier 103. The other video signal components each have a corresponding circuit FIG. 3 circuit, the combination of which form a sample rate converter 61. Typically, the single video signal component input to the circuit of FIG. 3 is an 18 MHz signal and each line delay 101 is clocked by an 18 MHz clock signal. In this manner, at each clock, the current scan line (scan line N) is input to the first line delay 101 and its preceding scan line (scan line N-1) is input to the next line delay 101 and so on up to a predetermined scan lines prior to scan line N (scan line N-i). Each scan line is also input to a corresponding multiplier 103. Each scan line is multiplied by a predetermined coefficient stored in multiplier coefficient storage 105 and the results are added in adder 107 to thereby form a video image which is stored in frame buffer 109 in which each scan line has been filtered by the vertical low pass filter defined by multipliers 103. The number of delay lines 101 and multipliers 103 is a matter of design choice determined by sample rate ratio, i.e., scan lines per frame required by output device 48 divided by the number of scan lines per frame input to sample rate generator 61, desired filter characteristics, i.e., steepness of cutoff slope and cost. The multiplier coefficients stored in multiplier coefficient storage 105 are also a matter of design choice determined by desired filter characteristics. Controller 111 generates control and address signals for use by multiplier coefficient storage 105 and frame buffer 109. Line delays 101 may be implemented using, for example, NEC UPD42102, multipliers 103 and adder 107 may be implemented with a Ratheon TMC2246. Multiplier coefficient storage 105 is a RAM or ROM. Controller 111 may be implemented using PALs such as PALCE26V12 and frame buffer 109 may be implemented with a static RAM such as MB82201. The specifics of how the filter characteristics are chosen and other design details of the circuit of FIG. 3 should be readily apparent to persons familiar with the design of sample rate converters. One source for obtaining such details is the *Handbook for Digital Signal Processing* by Sanjit K Mitra and James F. Kaiser published by John Wiley & Sons (1993).

In an alternate embodiment when alias and flicker reduction are not required, the scan generator can be modified to scan twice the required lines and to scan each line two times. Each pair of lines is then averaged to make 1 line with less noise than if scanned only once. Random noise will be reduced. The hardware is similar to the system described above except that only two multipliers are required and the scan address changes only every other line and the line gain is not changed from the standard telecine.

The present invention also has application in video cameras. In this environment, no telecine machine would be involved. The additional scan lines would be provided by using a CCD array with a larger number of rows in the vertical dimension than would otherwise have been used. The generated video signal would then be digitized for input to the sample rate converter of FIG. 3. The output of the sample rate converter would then be recorded as a digital signal on video tape or other recordable media or first converted to an analog signal for recording on video tape or other recordable media.

We claim:

1. A film to video transfer system comprising:
    a) a telecine machine including i) a scan generator and velocity corrector which generates a control signal used by a electron beam deflection system to produce a film scanning beam and ii) a detection system adapted to convert the film scanning beam to a digitized signal representing each film frame which has been scanned, said digitized signal representing a plurality of scan lines corresponding to each said film frame wherein the number of said scan lines is greater than the number of scan lines required by an output device;
    b) sample rate converter means coupled to said detection system for performing vertical sample rate reduction on each of said frames of digitized film frame information;
    c) means for storing said frames of digitized film frame information which have been vertical sample rate reduced for use by said output device.

2. The system defined by claim 1 further comprising: a) temporary storage means coupled between said detection system and said sample rate converter for storing a current frame of digitized film frame information.

3. A method of converting motion picture film images to at least one output video signal having a correct number of video lines comprising the steps of:
    a) reading substantially more vertical lines of information from a motion picture film image than is available on said output video signal;
    b) performing vertical sample rate reduction operating on a plurality of vertical lines of video to produce said output video signal with the correct number of video lines.

4. A method of reducing random noise in a system that reproduces film images in the form of video signals comprising the steps of:
    a) reproducing a particular area of the film with a first scan;
    b) reproducing said particular area of the film with a second scan;
    c) creating an output video signal that represents the average of said first scan and said second scan wherein said output video signal has less random noise than each individual scan;
    d) repeating steps a) through c) for a plurality of lines producing a video image.

5. A film to video transfer system comprising:
    a) a telecine machine including scan generator means operable to produce a film scanning beam and a detection system operable to convert film modulated light from said film scanning beam to a digitized signal representing information on the film wherein said digitized signal represents a plurality of progressively scanned lines corresponding to film frame information wherein the number of said scanned lines is greater than the number of scan lines available to an output device;
    b) sample rate conversion means coupled to said detection system for performing vertical sample rate reduction on each of said frames of digitized film frame information;
    c) output coupling means operable to present output of said sample rate conversion means to said output device.

6. The device described in claim 5 wherein said output coupling means comprises a frame store operable to generate an interlaced video signal.

7. The device described in claim 5 wherein said sample rate conversion means simultaneously operates on at least 3 neighboring lines.

8. A film to video transfer system comprising:
    a) a telecine machine including scan generator means operable to produce a film scanning beam and a detection system operable to convert film modulated light from said film scanning beam to a digitized signal representing information on the film, said digitized signal representing a plurality of non forward-sequential scanned lines corresponding to film frame information wherein the number of said scanned lines is greater than the number of scan lines available to an output device;

b) temporary storage means coupled to said detection system operable to provide a video signal representing sequentially ordered video;

c) sample rate conversion means coupled to said temporary storage means for performing vertical sample rate reduction on each of said frames of digitized film frame information;

d) output coupling means operable to present output of said sample rate conversion means to said output device.

9. The device described in claim 8 wherein said output coupling means comprises a frame store operable to generate an interlaced video signal.

10. The device described in claim 8 wherein said sample rate conversion means simultaneously operates on at least 3 neighboring lines.

11. Video camera system comprising:

a) a light detection system operable to convert an image to a digitized signal representing information in said image with said digitized signal representing a plurality of progressively sampled lines corresponding to said image information wherein the number of said sampled lines is substantially greater than the number of scan lines available to an output device;

b) sample rate conversion means coupled to said detection system simultaneously operating on groups of at least 3 neighboring lines for performing vertical sample rate reduction on said image information;

c) output coupling means operable to present output of said sample rate conversion means to said output device.

12. The device described in claim 11 wherein said output coupling means comprises a frame store operable to generate an interlaced video signal.

* * * * *